United States Patent [19]
Nieder et al.

[11] Patent Number: 5,500,032
[45] Date of Patent: Mar. 19, 1996

[54] METHOD FOR CONTINUOUSLY MELTING DOWN SCRAP METAL

[75] Inventors: Wolfgang Nieder, Linz; Manfred Winkler, Neuhofen; Gerhard Perchtold, Vienna; Leo Seirlehner, Linz, all of Austria; Herbert Kohler, Kornwestheim; Arwed Eberle, Reutlingern, both of Germany

[73] Assignees: Voest-Alpine Industrieanlagenbau GmbH, Linz, Austria; Mercedes-Benz Aktiengesellschaft, Stuttgart, Germany

[21] Appl. No.: 256,060

[22] PCT Filed: Oct. 19, 1993

[86] PCT No.: PCT/AT93/00158

§ 371 Date: Oct. 31, 1994

§ 102(e) Date: Oct. 31, 1994

[87] PCT Pub. No.: WO94/09163

PCT Pub. Date: Apr. 28, 1994

[30] Foreign Application Priority Data

Oct. 19, 1992 [AT] Austria ................. 2062/92

[51] Int. Cl.$^6$ ................................. C22B 9/16
[52] U.S. Cl. ................. 75/414; 75/572; 75/581
[58] Field of Search ................. 75/414, 572, 573, 75/576, 581

[56] References Cited

U.S. PATENT DOCUMENTS

| | | | |
|---|---|---|---|
| 3,529,067 | 9/1970 | Grott . | |
| 3,595,546 | 7/1971 | Uzdavines | 75/581 |
| 3,615,353 | 10/1971 | Mahoney | 75/581 |
| 3,839,016 | 10/1974 | Rawlings | 75/414 |
| 4,715,584 | 12/1987 | Hengelmolen . | |
| 4,925,489 | 5/1990 | von Bogdandy et al. . | |

FOREIGN PATENT DOCUMENTS

| | | |
|---|---|---|
| 41174 | 7/1989 | Austria . |
| 394733 | 6/1992 | Austria . |
| 46811 | 2/1986 | European Pat. Off. . |
| 304413 | 2/1989 | European Pat. Off. . |
| 470066 | 2/1992 | European Pat. Off. . |
| 511195 | 10/1992 | European Pat. Off. . |
| 657781 | 3/1938 | Germany . |
| 1800610 | 5/1970 | Germany . |
| 2504889 | 11/1975 | Germany . |
| 2504945 | 8/1976 | Germany . |
| 2734962 | 2/1979 | Germany . |
| 3219984 | 1/1983 | Germany . |
| 211361 | 7/1984 | Germany . |
| 3423247 | 1/1986 | Germany . |
| 3607776 | 9/1987 | Germany . |
| 3722645 | 9/1989 | Germany . |
| 2081740 | 2/1982 | United Kingdom . |

*Primary Examiner*—Melvyn Andrews
*Attorney, Agent, or Firm*—Cushman Darby & Cushman

[57] ABSTRACT

In a process for the continuous melting down of scrap metal, in particular of bales of scrap metal, which contain residual plastic materials, the scrap metal being fed to a melt-down reactor (1) and the heat required to melt this down being obtained by direct heating from below, using burners that are arranged close to the tapping point, the process is managed in the melt-down reactor (1) as a reducing process; part of the process gases is returned to the melt-down reactor (1) as combustion gas after utilization of the sensible heat and purification; the remaining portion is passed out as output gas. This makes it possible to operate without oversize gas purification systems when melting down scrap metal that contains plastic, and to utilize the pyrolysed substances that are contained in the working material to good effect.

14 Claims, 1 Drawing Sheet

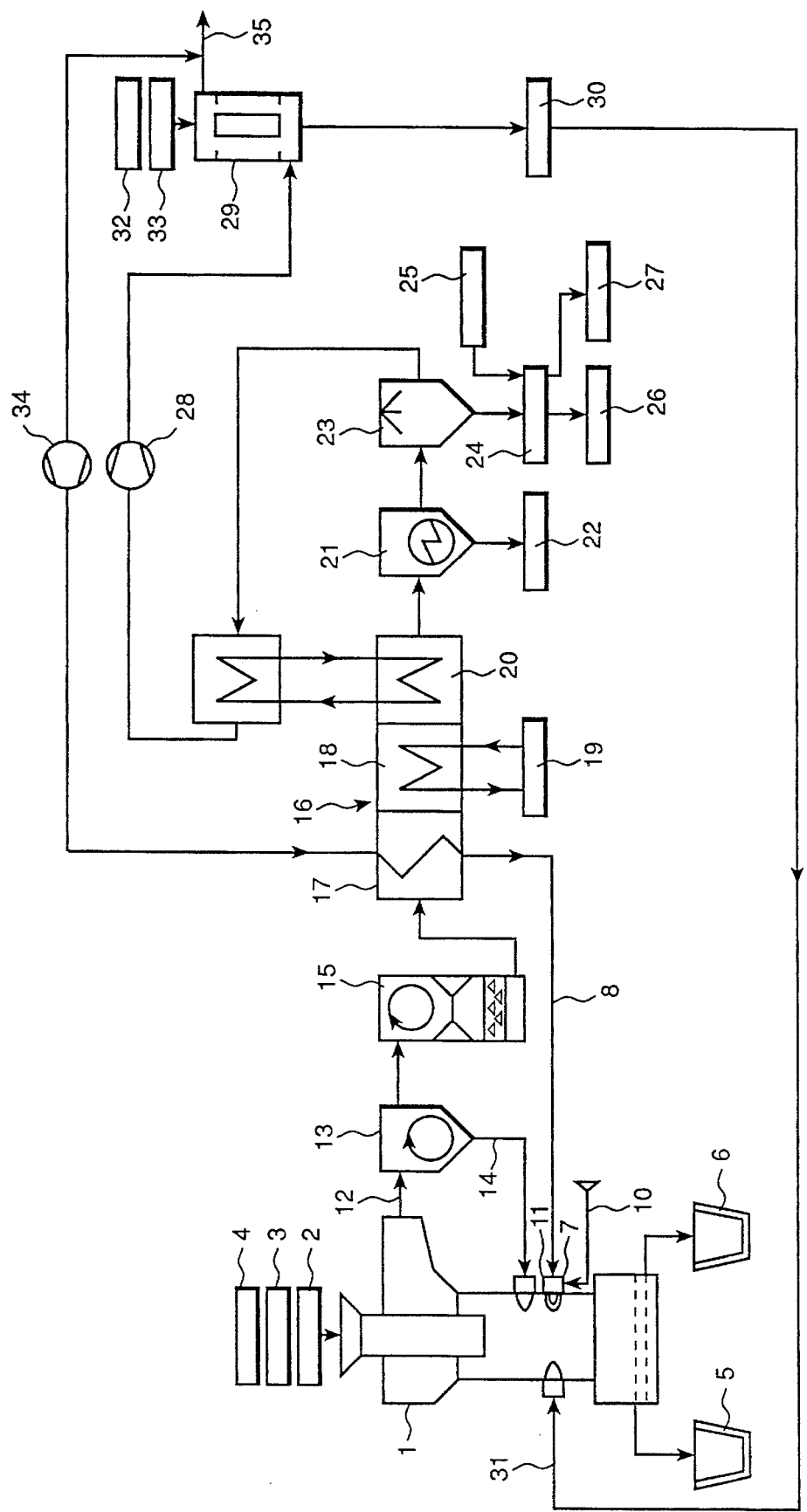

5,500,032

1

METHOD FOR CONTINUOUSLY MELTING DOWN SCRAP METAL

BACKGROUND OF THE INVENTION

1. Field of the Invention

The present invention relates to a method for continuously melting down scrap metal, in particular, bales of scrap metal containing residual plastic materials, the scrap metal being fed to a melt-down reactor and the heat required to melt the scrap being provided by direct heating from below, using burners that are located near the tapping point.

2. Description of the Related Art

The use of a shaft furnace to melt down scrap metal, in which the column of material that is to be melted is heated from below by burners, is already known from DE-PS 25 04 889. The fuel-oxygen combustion that is used in the shaft furnace for direct heating is so managed that a reducing atmosphere area is created beneath the oxidizing melt-down zone by adding large pieces of coal to the material to be melted. As a rule, relatively large amounts of plastic materials are contained in the material to be melted down, particularly when utilizing types of scrap metal that contain organic materials, such as occur, for example, when disposing of motor vehicles, or in the case of material that is to be melted down and which has been obtained by compressing bales of scrap metal, for example, from automobiles, and these lead to a relatively high concentration of injurious substances in the waste gases.

Considerable quantities of gas that contain harmful organic or inorganic substances are generated by heating melt-down reactors by burners, particularly in the case of the material that is to be melted down as referred to herein, so that large-scale and costly gas purifying facilities are required.

SUMMARY OF THE INVENTION

It is the aim of the present invention to so develop a method of the type described in the introduction hereto that scrap metal that contains plastics, in particular bales of scrap metal of the kind that result from the disposal of motor vehicles, can be melted down without the need to provide oversize gas purifying facilities. At the same time, the present invention is aimed at utilizing the pyrolysed substances contained in the material to be melted down to good effect and to minimize the energy and technical costs of the system accordingly. In order to do this, the method according to the present invention is essentially such that the process in the melt-down reactor is managed as a reducing process; such that some of the process gases are returned to the melt-down reactor as combustion gas after utilization of the sensible heat and purification; and such that the remainder is passed out as output gas. The reducing process in the interior of the melt-down reaction ensures that a process gas that contains a high proportion of chemically bound heat in addition to sensible heat is made available. The reducing management within the melt-down reactor offers the possibility of obtaining a combustion gas as process gas, which can be used subsequently as a substitute for the combustion gases that are used during the start-up phase of the melt-down reactor. Appropriate management and selection of the material to be melted down permits autothermic conduct of the process, a reducing atmosphere management of the process within the melt-down reactor then permitting a type of complete autothermic process management if, as in a preferred development, types of scrap metal with a chemi-

2 cally bound energy content of $>0.6$ kWh.t$^{-1}$ are used as the working material in the melt-down reactor.

A further improvement of the energy balance can be obtained in that the sensible heat of the waste gases is used to pre-heat the combustion gases that are returned to the melt-down reactor. This type of pre-heating of the returned combustion gases makes it possible to use low-quality combustion gas to maintain the desired process parameters within the interior of the melt-down reactor.

Plant-engineering are considerably reduced with a simultaneous reduction of energy consumption are considerably reduced in that more than 20%-vol. of the process gas that is drawn off is to the melt-down reactor as heated combustion gas after purification, in particular after HCl-scrubbing and $SO_2$-/$H_2S$ separation the remaining part being drawn off as output gas.

The remaining part of the process gas is drawn off as output gas. A process of this kind in a circulating system makes it possible to scale-down the systems for purifying the process gases to a considerable extent, when the method can be so regulated that the CO content of the process gases from the melt-down reactor can be adjusted to 30 to 40%-vol., in particular, approximately 36%-vol. by the substoichiometric introduction of $0_2$ gas. This kind of management of the process, with a CO content between 30 and 40%-vol. makes the process gas or combustion gas, which is distinguished by a thermal value of 1.5 to 2 kWh.m$^{-3}$n, available for an autothermic process.

Thus, it is an advantage that the process can be so managed that the output gas, which exceeds the amount of process gases that are returned, can be generated with a thermal value of 1.5 to 2 kWh.m$^{-3}$n after adsorptive purification. A thermal value of this kind permits problem-free return to the melt-down reactor and makes it possible to minimize the energy consumption with respect to additional primary energy carriers.

In order, in particular, to obtain an output gas with an even higher value, or to permit autothermic operation if the working substance has a chemically bound energy content that is too low, the procedure can, advantageously, be so managed that the process gas, in particular the output gas, is adjusted to a thermal value of 3 to 3.5 kWh.m$^{-3}$n in particular 3.3 kWh.m$^{-3}$n over a coke-bed reactor.

Particularly advantageous purification of the waste gases from the process can be achieved in that the process gases passed over a mixed bed adsorber that uses coke and lime and the charged adsorbent is returned to the melt-down reactor. This ensures that the removal of the sulphur that has been introduced into the system is effected by way of the slag so that, in particular, the undesirable production of surplus and additional secondary products, such as, for example, gypsum that contains chloride and fluoride, can he eliminated.

Simple and effective purification of the waste gases from the process can be effected in that the waste gases from the process are passed through a coarse separator, preferably a hot-gas cyclone-type separator to a thermal reactor and then to a heat exchanger for heating the combustion gases that are to be returned in the circulating system, in which connection the process gas can be used before physical and chemical purification, after pre-heating of the combustion gases that have been returned, in order to generate process steam. Process management of this type makes it possible to hold the product or process gas that is drawn off at the head of the melt-down reactor in a thermal reactor, after coarse dust removal, for a desired and sufficiently long reaction time in order to ensure the desired chemical conversion and, in particular, establishment of equilibrium, after which the sensible heat can be used in a heat exchanger, in order to pre-heat the combustion gas that is returned.

In a subsequent gas purification stage, dust that results from the process can be removed in the conventional manner by means of electro-filters and then hydrogen chloride/ hydrogen fluoride can be washed out, and a combustion gas that has been largely freed from the hydrogen halides is made available for return as a melting energy carrier or for use as an output gas after subsequent $H_2S$ and $SO_2$ adsorption.

The burners that are located close to the tapping point of the melt-down reactor are operated, at least in part, with the purified process gases, when, advantageously, 20 to 30%-vol. of the purified process gas is delivered to the burners. The process gas that is circulated is advantageously pre-heated to a temperature between 500° and 700° C., and preferably to a temperature of approximately 600° C., by counter-flow heating with the process gases prior to being delivered to the burners; this reduces the cost for producing the required melting heat to the point that an external supply of combustion gases, for example, natural gas, can be eliminated after the start-up phase.

The present invention is described in greater detail below on the basis of one embodiment that is shown diagrammatically in the drawing appended hereto and which is used for carrying out the process according to the present invention.

BRIEF DESCRIPTION OF THE DRAWINGS

FIG. 1 is a diagrammatic illustration of one embodiment of the present invention.

DETAILED DESCRIPTION OF THE PRESENTLY PREFERRED EXEMPLARY EMBODIMENT

The drawing shows a melt-down reactor 1, to which, in addition to metallic materials 2, for example scrap metal, which contains residual plastic materials, coke 3 and lime 4 are also added. Slag 5 as well as molten metal 6 are drawn off from the melt-down reactor 1 in its lower area. Possible carburization of the metallic smelt to a carbon content of approximately 3% requires the addition of coke at approximately 60 kg.t$^{-1}$ (relative to the molten metal); this can, however, be varied as a function of the metallic material that is being used.

The heat necessary to melt the metal within the melt-down reactor 1 is applied by direct heating from below in the lower area, using the burners 7 which, after the start-up phase, are supplied through the line 8 with process gases that are returned and purified together with an oxygen feed 10. The supply of oxygen (calculated at 90% purity) is effected at a temperature of approximately 100° C. For the start-up phase, or in the event that the thermal value of the process gases that are returned is insufficient for autothermic operation, additional combustion gas, for example natural gas, is supplied to the burners, as indicated diagrammatically in the drawings at 11.

Process gas is drawn off at the head of the melt-down reactor 1 through a line 12 and passed to a coarse separator, preferably a hot-gas cyclone-type separator 13, in which primary dust separation is carried out, whereupon the separated dust being returned to the melt-down reactor along the line 14.

The process gas passes from the hot-gas cyclone-type separator 13 into a thermal reactor 15 and is passed at a temperature of approximately 1,000° C. from this to a multi-stage heat exchanger 16, in which, in a first stage 17, the combustion gas that is to be returned and purified, which passes along the line 8 to the burner 7, is pre-heated from a temperature of approximately 90° C. to approximately 600° C. in a counter-flow heat exchanger. The process gas, which is essentially unpurified, is cooled from 1,000° C. to approximately 900° C. when this is done. In a subsequent waste-heat boiler 18, a major part of the sensible heat of the process gas is used to generate process steam, as is indicated at 19, when the gases are cooled to approximately 300° C. In a further circulating system 20, formed, for example, as a thermo-oil heat exchanger, the process gas is cooled even more before being passed to an electro-filter 21 in which, once again, dust 22 is separated out. Next, the process gas passes to an HCl scrubber 23 in which 95% of the hydrogen chloride and hydrogen fluoride are separated out. 30% or 50% caustic soda solution 25 is added to a waste water purification plant 24 in order to purify the waste water from the HCl scrubber 23, and NaCl granulate 26 as well as filter cake 27 can be removed from this purification plant.

After the HCl scrubber 23, the process gas is pre-heated to a temperature of approximately 90° C. in the heat exchanger 20 and then compressed in a fan 28 before it is passed to a travelling bed adsorber. In particular, the separation of $H_2S$, $SO_2$, as well as the residues of HCl and HF, takes place in this travelling bed adsorber. The adsorbent that is drawn off from the travelling bed adsorber 29, which is formed from lime and coke and indicated at 30 is returned to the melt-down reactor 1 along the line 31. The coke and lime that are used in the travelling bed adsorber or mixed bed adsorber 29 are numbered 32 and 33. By returning the adsorbent 30 that is charged with sulphur to the melt-down reactor, most of the sulphur is bound in the slag, which means that no waste or by-products such as REA gypsum, which contain sulphur, are generated in the gas purification process.

The purified process gas that is drawn off from the adsorber 29 is in part, for example, in a quantity of somewhat more than 20%-vol., compressed once more in an additional fan 34 and, as indicated above, pre-heated to approximately 600° C. in a counterflow heat exchanger before it is returned to the melt-down reactor once again by way of the burners 7.

The portion of the purified process gas that is not returned to the melt-down reactor is drawn off at 35 as output gas.

Taken all in all, apart from a certain start-up phase, the process runs to a large extent autothermically in that some of the purified reduction or process gas is returned, so that there is no requirement to use additional combustion gases. Thus, the energy required to produce metallic smelts in the melt-down reactor 1 is extracted in part from the organic fraction contained in the metallic working substance or scrap metal and, in part, from the coke that cannot be used for the carburization because of the carbon consumption reactions. The thermal value of the output gas that is produced is dependent, amongst other things, on the organic waste or plastic fraction in the scrap metal that is used. In the case of a scrap metal that consists of baled motor vehicles with an organic fraction of approximately 20%, the thermal value of the process or export gas that is produced by the process described herein is approximately 2.0 Kwh.m$^{-3}$n. In order to elevate the thermal value of the export gas, this can be passed over a coke-bed reactor, which is not described in greater detail herein.

The process in the melt-down reactor is carried on in a reducing atmosphere, i.e., sub-stoichiometrically, in such a way that on leaving the reactor the output gas has a CO content of approximately 30 to 40%-vol., preferably, approximately 36%-vol. Altogether, both the sensible and the chemically bound heat of the process gas is utilized, the utilization of the chemically bound heat being effected through the return of waste gas to the melt-down process. The thermal utilization is effected by combustion of the returned gases with a simultaneous oxygen feed to the burners 7.

We claim:

1. A process for continuously melting down scrap metal which contains residual plastic materials comprising:
   feeding scrap metal to be melted down to a melt-down reactor;
   supplying heat to melt down the scrap metal by direct heating from below using burners arranged close to a tapping point of the reactor;
   controlling operation of said reactor to be a reducing process;
   drawing process gases off from the reactor;
   using excess heat carried by said process gases;
   purifying said process gases;
   returning a portion of said process gases to the melt-down reactor as a combustion gas; and
   venting a remaining portion of said process gases as an output gas.

2. A process as in claim 1 wherein said step of purifying comprises HCl scrubbing and $SO_2$-/$H_2S$ separation and wherein said step of returning comprises returning more than 20% vol. of said process gases.

3. A process as defined in claim 1 or claim 12, wherein said step of using said excess heat comprises using said excess heat to pre-heat said portion of the process gases returned to the melt-down reactor.

4. A process as defined in claim 1, further comprising adjusting a CO content of the process gases from the melt-down reactor to about 30-40%-volume, by a sub-stoichiometric supply of $O_2$.

5. A process as in claim 4, wherein said step of adjusting comprises adjusting the CO content to approximately 36%-vol.

6. A process as in claim 1 or claim 14, wherein at least said remaining portion of said process gases has a thermal value of 1.5 to 2 $kWh.m^{-3}n$ following said purification step.

7. A process as in claim 1 or claim 14, further comprising adjusting a thermal value of at least said remaining portion of said process gases to 3.0 to 3.5 $kWh.m^{-3}n$, over a coke-bed reactor.

8. A process as in claim 7, wherein said step of adjusting said remaining portion of said process gases comprises adjusting to a thermal value of 3.3 $kWh.m^{-3}n$.

9. A process as in claim 1, wherein said step of feeding scrap metal comprises feeding scrap metal with a chemically bound energy content greater than 0.6 $kWh.t^{-1}$.

10. A process as in claim 1, further comprising passing said process gases over a coke-bed reactor that operates with coke and lime and returning a charged absorbent to the melt-down reactor.

11. A process as in claim 1 wherein said step of purifying comprises passing the process gases through a coarse separator to a thermoreactor and subsequently to a heat exchanger to heat said process gases.

12. A process as defined in 11 wherein said step of passing through a coarse separator comprises passing through a hot-gas cyclone-type separator.

13. A process as in claim 1, wherein said step of returning a portion of the process gases includes preheating said portion of said process gases to a temperature of between about 500–700° C. prior to entering burners of said reactor by counterflow heating said portion of said process gases with said process gases drawn off from said reactor.

14. A process as defined in claim 13 wherein said step of preheating said portion of said process gases comprises preheating to approximately 600° C.

\* \* \* \* \*